March 24, 1959
C. K. WILLIAMS
2,878,853
HEAVY DUTY VEHICLE TIRE
Filed March 7, 1957
2 Sheets-Sheet 2
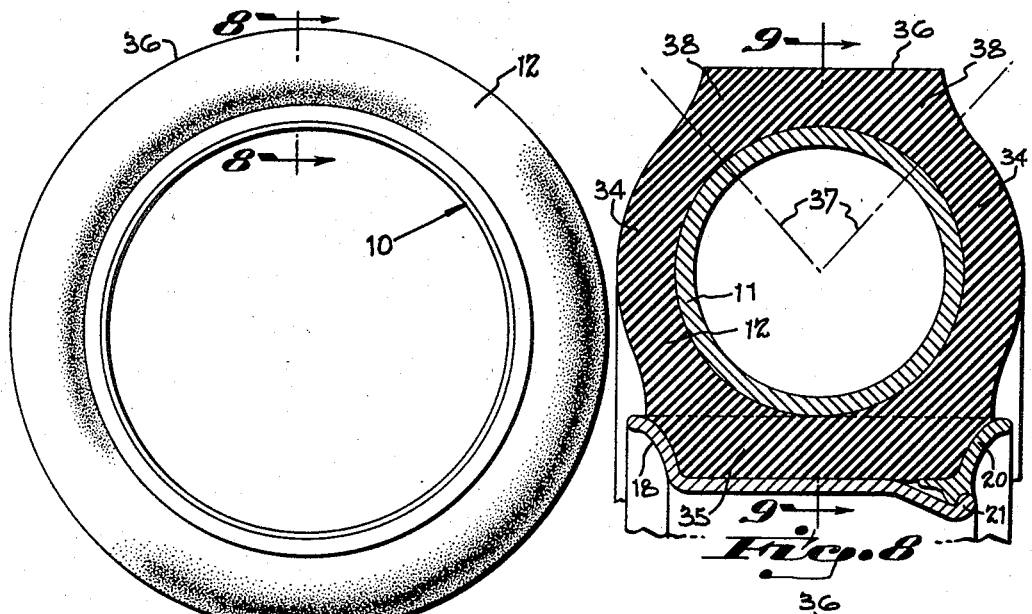
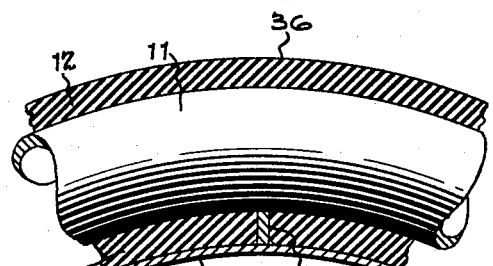
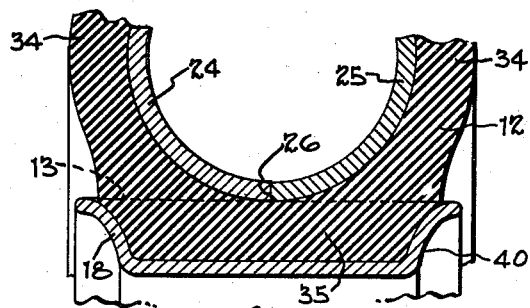
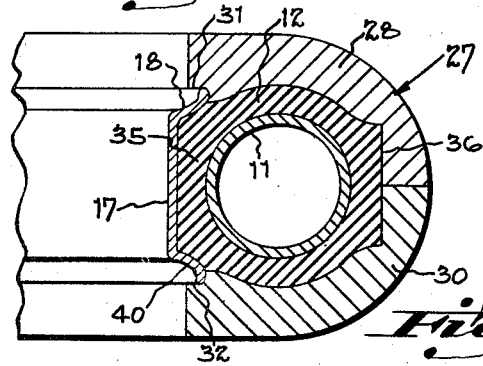
INVENTOR.
Clyde K. Williams.
BY Wood, Herron & Evans.
ATTORNEYS.

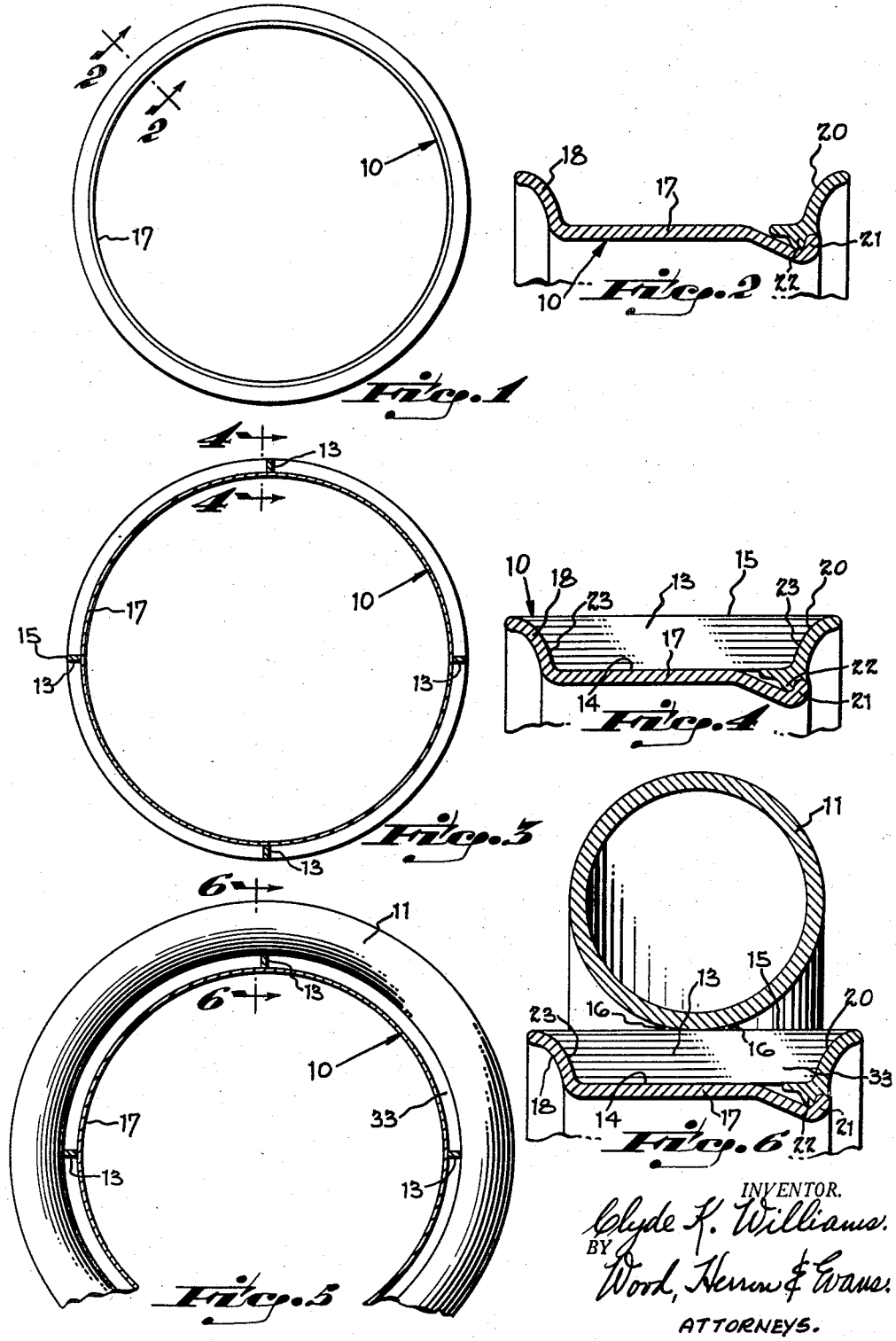

United States Patent Office 2,878,853
Patented Mar. 24, 1959

2,878,853

HEAVY DUTY VEHICLE TIRE

Clyde K. Williams, Covington, Ky., assignor to The Whirlaway Tire Corporation, Erlanger, Ky., a corporation of Kentucky Application March 7, 1957, Serial No. 644,667

6 Claims. (Cl. 152—323)

This invention relates to rubber tires for vehicle wheels and is directed particularly to a heavy duty tire structure for industrial and agricultural vehicles which require rubber tires but which do not require the cushioning action provided by conventional pneumatic tires.

By way of example, the conventional agricultural tractor, used in plowing, cultivating and other heavy draft operations, is equipped with rubber tires having a coarse tread pattern designed to provide maximum traction. However, the cushioning action of the tires is relatively unimportant since the vehicle usually is driven at a slow rate over the ground which is being worked. On the other hand, tractors of this class frequently must be driven at fairly high speeds over paved highways from one place to another, the driving transmission having a high speed range for this purpose. Accordingly, the rubber tires not only provide the traction needed in earth moving operations, but also have limited resiliency to prevent damage to the pavement during roadway travel. This dual service also is required of industrial earth moving equipment generally.

One conventional heavy duty tire of this type comprises a tough carcass or tire body fabricated from plies of fibrous cords, the side walls and tread being formed of rubber bonded to the carcass. The hollow interior of the tire usually is filled with non-compressible liquid, such as water having an additive to prevent freezing during the winter season. Since the casing is rendered practically non-elastic, the liquid-filled tire acts substantially as a solid mass which does not have the resilient qualities of the pneumatic tire.

One of the primary objectives of the invention has been to provide a heavy duty tire suitable for vehicles of the type indicated, but which is of simple construction and which is inexpensive in comparison to the cost of conventional tires of equivalent size and capacity. Briefly, it is the concept of the invention to provide a rubber tire which embodies an internal rigid tube structure in place of the conventional corded or fabric carcass, the tube being enclosed within a rubber or synthetic rubber casing which includes the rubber tread for heavy draft duty traction or for road travel. The tube preferably is formed of relatively thin-walled metal and carries the weight load of the vehicle, the load acting directly in compression on the rubber tread; hence, the rubber tread imparts limited resiliency to the otherwise rigid structure. The metallic load supporting tube structure is equal or superior to the fabric cord construction in its load bearing capacity and in its ability to transmit the traction forces to the rubber tire tread. Moreover, since the liquid-filled conventional tire acts substantially as a solid body, the present structure provides the same advantages but eliminates the cost of the conventional corded carcass. The structure of this invention has the further advantage of eliminating the periodic servicing which is necessarily associated with conventional liquid-filled tires or with high pressure air-inflated tires of a similar type.

Described generally, the present invention contemplates the combination of a metal rim having the usual side flanges, an annular metal tube forming the internal body or carcass of the tire, the tube being concentric with the rim and spaced outwardly by metal driving lugs seated between the flanges of the rim, the rim, driving lugs, and tube being welded together to form a rigid, one-piece assembly. The rubber casing, which constitutes the tread and side walls of the tire, completely surrounds the cross section of the tube and its base portion fills the concentric space between the rim and inside diameter of the tube. The rubber casing preferably is applied by the vulcanizing process, such that the casing is bonded permanently to the metallic surfaces of the annular tube and rim. In its preferred form, the external configuration of the rubber casing corresponds to a conventional tire.

The metal rim is of standard design; it may be demountable or it may form permanent part of a detachable vehicle wheel. The weight load of the vehicle is transmitted from the rim through the driving lugs to the rigid metal tube and acts in compression through the rubber tread section which is in contact with the ground or roadway surface. Since the tube is cylindrical in cross section, its outer periphery presents a convex load transmitting surface to the resilient rubber tread section. The load bearing portion of the tread, which is in contact with the ground or pavement, is substantially flat; therefore, the rubber tread section increases in thickness from the center line of the tire outwardly on opposite sides toward the side walls of the tire, causing the load to be distributed transversely across the tread from its center line outwardly on opposite sides toward the rubber side walls of the tire. The side portions of the tread and adjoining portions of the side walls are free to be displaced outwardly to some extent under the compressive loading. Therefore, the center tread area carries the major load, while the opposite side sections, by virtue of their increasing thickness and outward displacement, increase the total resiliency of the tire. However, the side walls beyond the tread area are not subjected to the flexing because of the rigid support provided by the wall section of the metallic tube. The resilient action of this construction is of advantage whether the structure is utilized on the drive wheels of a tractor or upon the load-supporting wheels of a towed vehicle.

In the preferred embodiment disclosed herein, the tire structure is assembled upon a rim of the demountable type which is attached to the wheel by lugs or other clamping devices well known in the art. Therefore, when the tire becomes worn after prolonged service, the integral tire and rim unit may be demounted conveniently and replaced with a new unit.

The detailed construction of the structure and its advantages are brought out more fully in the following description with reference to the attached drawings.

In the drawings:

Figure 1 is a side elevation of a demountable rim upon which the tire structure of the invention is to be fabricated.

Figure 2 is a sectional view taken along line 2—2 of Figure 1, showing on an enlarged scale the construction of the rim.

Figure 3 is a view generally similar to Figure 1, but showing the rim in section to illustrate the driving lugs which are welded in position crosswise between the rim flanges.

Figure 4 is an enlarged cross section taken along line 4—4 of Figure 3, detailing the rim structure at one of the cross lugs.

Figure 5 is a side view similar to Figure 3, showing the annular metal tube welded in place upon the lugs of the rim.

Figure 6 is an enlarged sectional view taken along line

6—6 of Figure 5, detailing the relationship and attachment of the annular tube and lugs.

Figure 7 is a side view of the fabricated tire and rim with the rubber tire molded in place.

Figure 8 is an enlarged cross-sectional view taken along line 8—8 of Figure 7, further detailing the fabricated structure of Figure 7.

Figure 9 is a longitudinal sectional view taken along line 9—9 of Figure 8, further detailing the structure.

Figure 10 is a fragmentary sectional view similar to Figure 8, showing a modified structure embodying the invention.

Figure 11 is a diagrammatic sectional view showing a split mold suitable for vulcanizing the rubber tire casing to the welded rim and the tube assembly.

Described generally with reference to Figures 7 and 8, the tire structure comprises a wheel rim 10 formed of metal, a core in the form of an annular tube 11, also of metal, and a casing 12 formed of rubber or synthetic rubber molded about the periphery of the core 11. Tube 11 is cylindrical in cross section and is carried upon a series of metal cross lugs 13 (Figures 3–6), the lugs being welded at spaced points about the circumference of the rim as at 14. The annular tube is seated upon the outer faces 15 of the lugs and is joined to the faces of the lugs by welding 16, such that the rim and tube form a rigid, one-piece metal, carcass or tire body.

The weight load of the vehicle, which is carried by the rim is thus transmitted by the cross lugs 13 to the annular tube 11, which in turn is supported by the tread portion of the rubber casing which rests upon the roadway. Accordingly, the structure is capable of heavy duty operation, while at the same time, it is relatively light in weight by virtue of the central air space delineated by the annular tube 11. In addition to its load bearing capacity, the metal carcass structure transmits the driving torque from the rim 10 directly to the rubber casing 12 at all points about its conference and isolates the driving strains and weight load from the side walls of the rubber casing 12.

Described in greater detail with reference to Figures 1–4, the rim 10 is of two-piece standard design, the rim proper consisting of a base section 17 having an integral side flange 18 curving upwardly and outwardly along one edge (Figure 2). The opposite side edge of the rim includes a normally detachable flange 20 similar in profile to flange 18, flange 20 being locked to the edge of the rim by inter-locking beads 21 and 22 of the rim and flanges. In the present instance, the flange 20 is attached permanently to the rim by the welded cross lugs as explained later.

The rim preferably is of the type which is demountably attached to the wheel of a vehicle, such that the entire unit may be replaced when worn after prolonged service. The rim attachment means (not shown), may consist of lugs which are attached by bolts to the wheel, the arrangement being conventional. On the other hand, the rim may form an integral part of a vehicle wheel which is demountably bolted to the flanges or drums carried by the vehicle axles. The demountable wheel structure also is conventional and has been omitted from the disclosure.

Referring to Figures 3 and 4, the cross lugs 13 preferably are in the form of metal bars such as steel, having their inner edges welded as at 14 to the section 17 of the rim. The opposite ends of the lug have a concave profile to fit snugly between the rim flanges 18 and 20, the ends being welded as at 23 to the flanges. The flange 20 is thereby secured rigidly to the rim structure. In the present example, four cross lugs 13 are utilized, the lugs being located at equally spaced points about the circumference of the rim.

After the lugs are welded in position, the annular tube 11 is slipped upon the rim (Figures 5 and 6) and welded as at 16 to the outer faces 15 of the lugs. The inside diameter of the tube corresponds to the outside diameter delineated by the faces 15, whereby the tube is located in concentric relationship with the rim. It will be noted in Figure 6, that the outer face 15 of each lug is flush with the outer edges of the flanges 18 and 20, such that the tube may be slipped into position without interference by the flanges.

Tube 11 may be fabricated from steel or from any other metal having sufficient wall strength to support the weight load and to withstand the impacts to which the tire assembly may be subjected while in service. The method of fabricating the tube 11 is not material to the invention; however, in the example illustrated in Figure 5, it may be rolled to shape from a straight length of tubing, the opposite ends of the tube being joined by welding. On the other hand, the tube may be of two-piece construction, utilizing sheet metal stampings which are semi-circular in cross section, the open faces of the stampings being welded in face-to-face relationship. This construction is illustrated in Figure 10, the two half-sections being indicated at 24 and 25 and being joined together by welding as indicated at 26.

After the metal parts of the core assembly are welded together, the rubber casing 12 is molded in position, if necessary, the metal surfaces first being suitably treated to facilitate bonding of the rubber. The rubber casing may be vulcanized in the conventional manner utilizing for example, a modified split tire mold of the type indicated at 27 in Figure 11. The mold is shown diagrammatically in Figure 11 and comprises the two sections 28 and 30 providing the usual cavity which delineates the configuration of the tire, the inner edges of the mold seating as at 31 and 32 upon the opposed outer edges of the rim flanges. By this arrangement, the annular tube 11 is located in centered position with respect to the cavity, with all points about its periphery concentric with the cavity. It will be noted that the rim completes the mold cavity, such that the rubber in the cavity completely surrounds the rigid core tube and fills the concentric space 33 between the tube 11 and base section 17 of the rim, thereby being bonded to the surfaces of the rim and to the tube surface (Figure 8).

The molded casing 12 comprises the rubber side walls 34 joined at their base by the rubber section 35 which extends across the rim in the annular space 33. The base section is interrupted at spaced points by the cross lugs 13 as shown in Figure 9. The tread 36 of the casing has a substantially flat external surface which preferably includes an irregular traction surface or pattern (not shown).

As noted earlier, the weight load of the vehicle is transmitted from the rim through the cross lugs 13 and rigid tube 11 to the portion of the tire tread 36 which is in contact with the ground. It will be noted in Figure 8, that the cylindrical surface of the rigid tube 11, which is presented to the tread section, creates a transverse rubber tread section which increases in thickness in opposite directions from the central plane of the tire, as delineated approximately by the broken lines 37 in Figure 8. The thicker, more resilient tread sections blend into the side walls as indicated at 38 and are free to be displaced outwardly to a limited extent under the compressive forces in accordance with the load imposed upon the tread. As viewed in the plane of the tire (Figure 9), the over-all curvature of tube 11 completes a load transmitting face which is generally convex. It will be seen therefore, that the convex face of the rigid cylindrical tube causes the load to be carried in compression in the central tread area and upon the surrounding displaceable sections, thereby increasing the resiliency of the tire under any given load which it is capable of carrying.

After the rubber tread 36 has become worn to a point where replacement is necessary, the worn unit may be returned to the factory for retreading. For this purpose, the metallic rim and carcass is placed in a suitable mold as outlined earlier. The reconditioned tire will naturally have the same strength and capacity as a new unit since the carcass is not subjected to fatigue due to flexing as is the case with the conventional cord-type carcass.

In the modified structure shown in Figure 10, the entire rim 10 is of one-piece metal construction, the flange 40 being substituted for the bead-mounted flange 20 previously described. The modified structure includes the same cross lugs 13 and rigid tube 11, the tube being either of one-piece cross section shown in Figure 8 or being formed of half sections as shown in Figure 10. The tire casing 12 is molded in place after fabrication and welding of the metal parts in the manner described above.

Having described my invention, I claim:

1. A heavy duty tire structure for vehicles comprising, a wheel rim of rigid metallic construction, an annular core tube of rigid metallic construction, said tube being generally cylindrical in cross section, said tube being rigidly mounted upon said rim in concentric relationship therewith, a rubber casing bonded to the surface of said rigid core tube, said rubber casing having a tread section, said tread section having a thickness less than the diametrical cross section of said rigid core tube, said tread section having a substantially flat exterior surface, the weight load of a vehicle being transmitted from the rim to said rigid core tube, said rigid tube presenting a load transmitting surface to said tread section which is generally convex, said convex surface delineating a rubber tread section which increases in thickness and resiliency from the center portion of said convex surface outwardly therefrom, whereby the major weight load of the rim is imposed in direct compression in the center area of said tread section and a portion of the load is carried by the portions of the tread section which have a greater thickness and resiliency.

2. A heavy duty tire structure for vehicles comprising a wheel rim of rigid metallic construction, a plurality of spacer elements projecting outwardly from the external circumference of the rim and connected thereto, an annular core tube of rigid metallic construction, said tube being generally cylindrical in cross section, means rigidly connecting the core tube to said spaced element in concentric relationship with said rim and spaced outwardly therefrom, a rubber tire casing enclosing said rigid core tube, said rubber casing having side walls and an external tread section and extending across the space between the tube and rim, the weight load of the vehicle being transmitted from the rim through said spaced element to the rigid core tube, said core tube presenting a convex load bearing surface to said tread section, the side walls of said casing being relieved of the weight load by said rigid core tube.

3. A heavy duty tire structure for vehicles comprising a wheel rim of rigid metallic construction, a plurality of spacer elements projecting outwardly from the external circumference of the rim, an annular core tube of rigid metallic construction, said tube being generally cylindrical in cross setion and having an inside diameter seated upon said spacer elements and attached thereto, said spacer elements rigidly supporting said core tube in concentric relationship with the rim and delineating an annular space between the rim and inside diameter of said tube, a rubber tire casing bonded to the surface of said rigid core tube, said rubber casing having side walls and an external tread section, said casing having a base section extending across said annular space between the tube and rim, said base section being integral with the side walls and being bonded to said rim and tube, the weight load of the vehicle being transmitted from the rim through said spacer elements to the rigid core tube, said core tube presenting a convex load bearing surface to said tread section, the side walls of said rubber casing being relieved of the weight load by said rigid core tube.

4. A heavy duty tire structure for vehicles comprising a wheel rim of rigid metallic construction, said rim having a base section and a pair of side flanges projecting outwardly from opposite side edges of the base section, a plurality of driving lugs, each of said lugs projecting across the base and extending to the flanges of said rim and being welded to the surfce of said base section and flanges, each of said driving lugs having an exposed face which is substantially flush with the outer edges of said flanges, a rigid annular core tube, said core tube being substantially cylindrical in cross section, said annular tube having an inside diameter seated upon the exposed faces of said driving lugs and welded thereto, the inside diameter of the tube residing in concentric relationship with the base section of said rim and delineating an annular space about the base section of the rim, and a resilient tire casing extending about the cylindrical cross section of said core tube and across the said annular space between the tube and rim, said tire casing providing an external tread surface and a pair of side walls extending from said tread surface to the flanges of the rim, said rim transmitting the weight load of a vehicle through said driving lugs to the rigid core tube, said tube presenting a convex load-transmitting face and delineating a load-bearing tread section which increases in thickness from the center portion of the said convex face outwardly therefrom, the outward portion of the tread section being displaceable outwardly in response to compressive force imposed therein by the said convex face, thereby to increase the resiliency of the tire, the side walls of the casing beyond said tread area being relieved of the weight load by the rigid core tube.

5. A heavy duty tire structure for vehicles comprising a wheel rim of rigid metallic construction, said rim having a base section and a pair of side flanges projecting outwardly from opposite side edges of the base section, a plurality of driving lugs, each of said lugs projecting across the base and extending to the flanges of said rim and being welded to the surface of said base section and flanges, each of said driving lugs having an exposed face which is substantially flush with the outer edges of said flanges, an annular core tube of rigid metallic construction, said core tube being substantially cylindrical in cross section, said core tube having an inside diameter seated upon the exposed faces of said driving lugs and attached thereto, the inside diameter of the tube residing in concentric relationship with the base section of said rim and delineating an annular space about the base section of the rim, and a resilient tire casing, said tire casing extending about the cylindrical cross section of said tube and across the said annular space, said tire casing being bonded to the surfaces of said tube and to the surfaces of the rim, said tire casing providing an external tread surface and a pair of side walls extending from said tread surfaces on opposite sides to the flanges of the rim, said rim transmitting the weight load of a vehicle through said driving lugs to the rigid core tube, said tube presenting a convex load-transmitting face and delineating a load-bearing tread section which increases in thickness from the center of the tire outwardly on opposite sides toward the side walls thereof, the portions of the side walls adjoining the opposite sides of the tread, which are bonded to the core tube, carry a portion of the weight load, the side walls of the casing beyond said portions being relieved of said weight load by the rigid core tube.

6. A heavy duty vehicle tire structure for vehicles comprising, a wheel rim of rigid metallic construction, an annular core tube of rigid metallic construction, said tube being generally cylindrical in cross section, said tube being rigidly mounted upon said rim in concentric relationship therewith, a rubber casing bonded to the surface of said rigid core tube, said rubber casing having a rubber tread section extending around the outside diameter of the rigid core tube, said tread section having a central load-bearing area, the weight load of a vehicle being transmitted from the rim to the rigid core tube, said rigid annular core tube presenting a generally convex load-transmitting surface to the central load-bearing area of the tread section, whereby the major weight load of the rigid core tube is imposed in direct compression upon the central load-bearing area of the rubber tread section, the rubber tread section on opposite sides of said central load-bearing area having a greater thickness than said central area and thereby increasing the resiliency of the tire structure.

References Cited in the file of this patent

UNITED STATES PATENTS

| | | |
|---|---|---|
| 1,420,392 | Taylor | June 20, 1922 |
| 1,553,154 | Gammeter | Sept. 8, 1925 |

FOREIGN PATENTS

| | | |
|---|---|---|
| 28,551 | Great Britain | 1907 |